(12) United States Patent
Gleasman et al.

(10) Patent No.: US 7,575,534 B2
(45) Date of Patent: Aug. 18, 2009

(54) TRANSMISSION WITH RESISTANCE TORQUE CONTROL

(75) Inventors: James Y. Gleasman, Rochester, NY (US); Keith E. Gleasman, Fairport, NY (US); Donald Gabel, Rochester, NY (US)

(73) Assignee: Torvec, Inc., Rochester, NY (US)

( * ) Notice: Subject to any disclaimer, the term of this patent is extended or adjusted under 35 U.S.C. 154(b) by 403 days.

(21) Appl. No.: 11/615,532

(22) Filed: Dec. 22, 2006

(65) Prior Publication Data

US 2008/0153663 A1 Jun. 26, 2008

(51) Int. Cl.
*F16H 3/44* (2006.01)

(52) U.S. Cl. .................... 475/317; 475/319; 475/325

(58) Field of Classification Search ............... 475/311, 475/313, 317, 319, 323, 325
See application file for complete search history.

(56) References Cited

U.S. PATENT DOCUMENTS

| | | | | |
|---|---|---|---|---|
| 286,206 | A * | 10/1883 | Lavery | 254/356 |
| 291,673 | A * | 1/1884 | Braun | 192/36 |
| 2,751,788 | A * | 6/1956 | Forrest | 74/10.52 |
| 3,020,781 | A | 2/1962 | Burtnett | |
| 3,051,021 | A * | 8/1962 | Miller | 475/60 |
| 3,835,731 | A | 9/1974 | Herzog | |
| 4,192,201 | A | 3/1980 | McCoin | |
| 4,195,537 | A * | 4/1980 | Sessler | 475/157 |
| 4,878,401 | A * | 11/1989 | Chung | 475/153 |
| 5,067,932 | A | 11/1991 | Edwards | |
| 5,186,692 | A | 2/1993 | Gleasman et al. | |
| 5,364,320 | A * | 11/1994 | Ra et al. | 475/280 |
| 5,513,553 | A | 5/1996 | Gleasman et al. | |
| 5,618,242 | A | 4/1997 | Wu | |
| 6,010,423 | A | 1/2000 | Jolliff et al. | |
| 6,066,065 | A * | 5/2000 | Breen | 475/312 |
| 6,342,023 | B1 | 1/2002 | Willmot | |
| 6,634,976 | B1 | 10/2003 | Britt | |
| 6,748,817 | B2 | 6/2004 | Gleasman et al. | |
| 7,462,124 | B2 * | 12/2008 | Han | 475/270 |
| 2003/0032517 | A1 | 2/2003 | Keiser | |
| 2005/0178115 | A1 | 8/2005 | Hughey | |
| 2005/0247504 | A1 | 11/2005 | Gleasman et al. | |
| 2006/0283185 | A1 | 12/2006 | Wrona et al. | |

FOREIGN PATENT DOCUMENTS

| | | |
|---|---|---|
| EP | 787243 B1 | 8/2003 |
| WO | WO 9012968 A1 * | 11/1990 |
| WO | WO03071159 A2 | 8/2003 |

* cited by examiner

*Primary Examiner*—Ha D. Ho
(74) *Attorney, Agent, or Firm*—Brown & Michaels, PC

(57) ABSTRACT

The transmission includes a minimal-orbiter gear complex and a single infinitely-variable rotary control device. The minimal orbiter includes only a control gear and an output gear interconnected by the different gearing portions of at least one cluster gear supported by an orbiting web responsive to an input drive provided by a primary engine. The rotary control device may be any kind of apparatus that is capable of providing resistance torque that can match the torque of the primary engine to slow and stop the control gear of the orbital complex. In a preferred embodiment disclosed, the rotary control device is a hydraulic jack machine having a drive shaft connected to an adjustable swash plate that provides primary control of the flow of fluid through the machine.

18 Claims, 3 Drawing Sheets

TRANSMISSION WITH RESISTANCE TORQUE CONTROL

REFERENCE TO RELATED APPLICATIONS

The subject matter in this application is related to the subject matter in U.S. patent application Ser. No. 11/153,112, filed Jun. 15, 2005, entitled "ORBITAL TRANSMISSION WITH GEARED OVERDRIVE", now U.S. Pat. No. 7,475,617, issued Jan. 13, 2009. The aforementioned application is hereby incorporated herein by reference.

BACKGROUND OF THE INVENTION

1. Field of the Invention

The invention pertains to the field of automotive transmissions. More particularly, the invention pertains to an automotive transmission with orbital gearing and a variable sun gear control.

2. Description of Related Art

Known conventional transmissions use the vehicle's engine as the primary control for making changes in vehicle speed.

The manual transmission uses a clutch to change the gear ratio, with the engine being completely disconnected from the transmission momentarily during each level of gear change, and also with the engine being quickly revved up to fairly high rpm during each level change.

The standard automatic transmission uses a torque converter to avoid the complete disconnect of the engine between levels of gear ratio change, but the inefficiency of the torque converter causes considerable slippage between engine and transmission output, particularly during initial start-up and lower speeds when as much as 50% of the engine torque may be lost. This type of transmission blends engine and transmission better than the manual, but the engine still must be revved to higher rpm during each level of multiple gear change. Also, even during engine idle when the vehicle is stationary, the automatic transmission creates a constant loss of efficiency through hydraulic losses occurring in the torque converter.

The conventional acceleration rates for engine rpm during the revving for each gearing level in both manual and automatic transmissions is often between 1000-2000 rpm/sec, and this rapid acceleration of the engine's internal parts (crank shaft, pistons, valve cams) can result in a 20-25% loss in efficiency.

There have been many different forms of automatic infinitely-variable transmissions ("IVT"), in which usable torque is supplied to the drive wheels of the automotive vehicle through a continuum of constantly variable speeds. The IVT is distinguished from the continuously-variable transmission ("CVT"), in which vehicle speed is continuously changed throughout several successively-increasing speed and torque output levels. However, until recently, no IVT or CVT has been developed that is capable of successfully handling a full range of torque and engine sizes from a very small vehicle through a large commercial truck. Torvec, Inc., the assignee of the present invention, has recently successfully tested an IVT that can be readily sized to cover this entire range of engine size and torque requirements. Also, this recently tested IVT was specifically designed for propelling not only large SUVs (sport utility vehicles) but also small trucks and school busses. One of the latest designs of the Torvec IVT is disclosed in U.S. Pat. No. 6,748,817 entitled "Transmission with Minimal Orbiter".

Torvec IVT's have been progressively improved during an extensive period of product testing, and a current design produces continuous changes of torque and speed from start-up through an overdrive ratio without any intermediate discontinuities while using engine acceleration rates of no more than 90-100 rpm/sec. These remarkable results are achieved with an apparatus that is significantly smaller and lighter than presently available conventional automotive transmissions.

The earlier Torvec IVT designs combined a variable hydraulic pump and a hydraulic motor with a gear orbiter to form an infinitely variable transmission so that, as the speed of the hydraulic motor increases the rotation of the gear orbiter, the output shaft speed increases and the speed of the vehicle increases. This basic design was recently significantly modified to operate in an unconventional manner. Namely, while the engine input was delivered to an input sun gear of the orbiting gear complex, the changes in output gear ratios were obtained by using the combined operation of the variable hydraulic pump and motor to slow the rotation of the web so that, as the rotation of the web in the direction of the engine was slowed, the transmission produced a continuously decreasing gear reduction, and, when the web was brought to a stop, the transmission provided an overdrive ratio of the engine input.

The recent Torvec transmissions just discussed above increase transmission efficiency by using a hydraulic pump and motor combination, rather than the vehicle engine, as a primary control of vehicle speed, thereby avoiding the above-mentioned engine acceleration losses. However, these recent Torvec transmissions still lose efficiency through the split torque path that delivers torque to the hydraulic pump and motor.

As just indicated above, when accelerating a vehicle with both manual and automatic transmissions, the revving of the engine, far exceeding 2,000 rpm, during various gear change levels is an inefficient use of horsepower. Even the relatively new Torvec IVT transmissions are burdened with the inefficient use of horsepower that arises from the division of a portion of the vehicle engine output into a split path for driving the transmission's hydraulics.

Special attention is also called to another prior art apparatus, namely, the Torvec long-piston hydraulic machines disclosed in U.S. Pat. No. 6,983,680 and U.S. 2004/0168567, which are hereby incorporated herein by reference. This special prior art is referred to in greater detail in the Summary portion below.

The invention disclosed herein is a further improvement of the successfully-tested earlier versions of the Torvec IVT just discussed above, and the hydraulic machine in the disclosed preferred embodiment utilizes a variation of the hydraulic machine disclosed in U.S. Pat. No. 6,983,680 and U.S. 2004/0168567.

SUMMARY OF THE INVENTION

The inventive transmission is a remarkably small structure that includes a minimal-orbiter gear complex and a single a rotary control device. The minimal orbiter includes only: a control gear and an output gear interconnected by the different gearing portions of at least one cluster gear supported by an orbiting web responsive to an input drive provided by a primary engine. The rotary control device may be any kind of apparatus that is capable of providing infinitely-variable resistance torque sufficient to match the torque of the primary engine to slow and stop the control gear of the orbital complex. In a preferred embodiment, the rotary control device is a hydraulic jack machine having a drive shaft connected to an adjustable swash plate and having input and output ports connected through a very minimal fluid passage that is closed by a controlled pressure valve.

While the disclosed preferred embodiments of a transmission of the present invention all utilize a single hydraulic machine as the rotary control device, all of these embodiments omit the split torque path that is conventionally used in hydraulically-controlled transmissions. None of the disclosed embodiments directly split off a portion of the engine torque to a path for operating the hydraulics. Instead, the engine torque is directed only through the mechanical gearing of the transmission. Also, the single hydraulic machine that generates resistance torque during vehicle acceleration places negligible load on the vehicle's engine during start-up, engine idle, and vehicle cruising.

To summarize the preferred operation of a transmission of the present invention: When the vehicle's engine is initially started, the orbital web of the small gear complex moves with the engine drive. The transmission output gear is connected to the vehicle's drive shaft, and when the parked vehicle's wheels are standing still on the terrain, the output gear is held in a stopped condition, and the cluster gears spin around the stopped output gear as the orbital web moves with the engine drive. Under these conditions with the preferred gear ratios indicated herein, the control gear rotates at approximately one-half the engine input speed. The swash plate of the hydraulic machine is set at 0°; the control valve is open; and the hydraulic drive gears and the shaft of the hydraulic machine merely rotate freely with the control gear at one-half engine speed, adding only a minimal frictional load.

In this regard, special attention is called to the fact that preferred embodiments of the invention use a variation of the above-mentioned prior art Torvec long-piston hydraulic machine. Commercial-quality prototypes of these Torvec long-piston hydraulic machines have already been successfully built and tested in both large SUVs (sport utility vehicles) and small trucks, and while these remarkable hydraulic machines have not yet enjoyed wide publicity, they are the preferred hydraulic machines for use with the invention described herein. The preference for this design of hydraulic machine cannot be over emphasized, since presently available commercial hydraulic pumps and motors are considered unacceptable for use with the subject invention because: (1) they are much larger and much heavier than the Torvec long-piston machines; (2) they are incapable of providing the high speeds needed for automotive use; (3) they do not have the start-up torque capabilities of the Torvec long-piston machines; (4) their "break-away" torque makes them inappropriate for the invention, requiring tens of pounds of force to begin to turn their drive shafts even when unloaded, whereas the unloaded drive shaft of a Torvec long-piston machine can be rotated by hand or finger grip; and (5) the volumetric efficiency of present commercial hydraulic machines is poor at low swash plate angles, whereas in actual testing, a Torvec machine produced 2000 psi or more at a swash plate angle of 1.5° with an input speed of 1700 rpm, registering a volumetric efficiency of about 95% at this small angle. With these just-listed deficiencies, if such standard hydraulic machines were to be used in the subject transmission, many of the advantages of the invention would be lost, e.g., the invention's neutral "no-load" condition could not be achieved, the vehicle's brake would have to be applied to avoid vehicle "creep" when standing in traffic on level ground, etc.

While the orbital gearing of a transmission of the present invention is preferably connected at all times to the hydraulic machine, the only notable load provided by the hydraulics occurs when the swash plate is adjusted to change the transmission gear ratios during vehicle operation. This hydraulic load provides a resistance torque that gradually slows the speed of rotation of the control gear through a continuum of decreasing speeds that begin when the swash plate is tipped as little as 1-1.5°. The progressive increase in resistance torque generated by the hydraulic machine causes a proportionally progressive slow-down of the control gear. The slow down of the control gear creates driving torque from the transmission output through an infinitely-varying gear ratio that begins, momentarily, from ∞:1-300:1 when the swash plate is tipped as little as 1-1.5°, and ends when the swash plate is at 25°, bringing the control gear to a stop and producing a transmission output at a predetermined overdrive ratio (e.g., 1:0.7).

Special attention is called to the fact that a hydraulic machine is not acting like a conventional hydraulic pump or motor in the present invention. Thus, the increasing torque provided by the hydraulic machine is not generated by an increasing flow of hydraulic fluid. To the contrary, with the minimal passage between the hydraulic input and output ports of the hydraulic machine blocked by a pressure valve, there is no significant volumetric flow of hydraulic fluid at any time. The only flow of fluid is a relatively small blow-by in response to the pressure being developed within the hydraulic machine accompanied by a concomitant replenishing of the blow-by to the low pressure side of the hydraulic machine from the hydraulic system's conventional charge pump. In effect, the hydraulic machine is operating like a hydraulic "jack". Each infinitely-variable movement of the swash plate corresponds to the cranking of the jack handle, causing movement of the pistons of the machine to create ever-increasing levels of hydraulic pressure that act as resistance torque to slow the rotation of the swash plate, in a manner similar to the way that each crank of the jack handle increases pressure in the small hydraulic jack to raise the load slowly without any appreciable flow of hydraulic fluid.

When vehicle acceleration is desired, the minimal fluid passage that connects the input and output ports of the hydraulic machine is closed off by the pressure valve so that piston movement is limited by the just-mentioned minimal flow of blow-by as pressure is built up by the small angular adjustment of the swash plate that is rapidly rotating at the speed of the control gear. The minimal blow-by, which is less than 5% of the volume of fluid blocked within the machine by the closed valve, permits the angle of the rotating swash plate to be increased, increasing the resistance torque that slows the rotation of the control gear. The minimal blow-by at 1700 rpm is preferably less than 1 gal/min and is conventionally replenished to the low pressure side of the hydraulic machine by a small charge pump.

A transmission of the present invention provides a significant gain in engine efficiency by using the just-described simplified hydraulic-jack apparatus rather than the vehicle engine as the primary means for vehicle acceleration. Efficiency is increased during all accelerations up to highway cruising speeds because: (1) the vehicle engine remains at idle speeds or at a slightly increased rpm level within a continuum of relatively low rpm's (preferably 750-±1500 rpm at a rate of typically 75-100 rpm/sec), and at the same time (2) the simplified transmission provides consecutive infinitely-variable increases in output rpm while concomitantly providing consecutive proportional infinitely-variable decreases in torque (through gear ratio decreases). Because the transmission generates such extremely large starting torques at very low vehicle speeds, and because the changes in torque and vehicle speed remain proportional, the horsepower expended by the engine may thereby be more closely matched to the needs dictated by road and traffic conditions.

The transmission hydraulics are only active when providing the infinitely-decreasing gear reduction during the acceleration process. When the vehicle is stopped, the swash plate is returned to 0° and the pressure valve is opened, deactivating the hydraulic-jack effect, and the deactivated hydraulics consume minimal, if any, horsepower. When the vehicle is at cruising speeds, the hydraulics are pressurized and remain locked to hold the control gear in its stopped position, like a load being held up by a hydraulic jack, again consuming minimal, if any, horsepower except for the energy required for the charge pump to replenish the fluid lost in blow-by.

In actual vehicle testing, a transmission of the present invention reasonably accelerated the vehicle to 30 mph with a relatively minor increase in engine speed (e.g., 750-1000 rpm at about 75-100 rpm/sec). This is a significant improvement over the relative inefficiency of present conventional transmissions that achieve vehicle acceleration by rapidly increasing engine speed to over 1500 rpm during vehicle acceleration, unnecessarily wasting engine efficiency. In actual in-vehicle testing, a transmission of the present invention was found to consume approximately half as much fuel as conventional automatic when in a stopped condition with the vehicle in "drive" (e.g., stopped at a traffic light).

Of course, many operators lack the expertise or patience to learn the manual control procedures just explained above, and many others are unnecessarily "heavy footed" on the accelerator pedal. Therefore, in one embodiment of the present invention vehicle operation is computer-assisted. Such computer programs sense the angle of the accelerator pedal, as well as the rate at which this angle has been increased or decreased by the operator, to progressively select engine speeds from a continuum of relatively low rpm, the rate of engine speed progression being controlled to optimize the horsepower/fuel consumption for the desired acceleration rate indicated by the operator's actions. After the vehicle reaches a desired speed level, as indicated by the operator's released angle of the accelerator, the computer backs off the engine to the lowest rpm level necessary to maintain that speed.

Recent Torvec IVT transmissions have been much smaller and lighter than the conventional transmissions that they replace, and a transmission of the present invention is even smaller and has significantly less volume weight than the earlier IVT designs, since it omits one complete hydraulic machine.

In another embodiment of the present invention, a second hydraulic machine is included to create a hybrid drive. The vehicle's primary drive is provided by either a gas or diesel engine using the invention's just-described simplified hydraulic transmission. However, an accumulator assembly is added to the structure (a) to store the kinetic energy of the vehicle during coasting or braking in the form of pressurized hydraulic fluid and (b) to reuse that stored energy to assist in the acceleration or driving of the vehicle. The rotation of the vehicle's drive shaft during coasting and braking conditions is used as input to a hydraulic machine, acting as a pump, to deliver hydraulic fluid from a reservoir to a pressurized tank. To assist in the acceleration of the vehicle, this same hydraulic machine, acting as a motor, is driven by the stored pressurized fluid to provide supplemental driving torque to the vehicle's drive shaft.

DETAILED DESCRIPTION OF THE INVENTION

Figure 1:
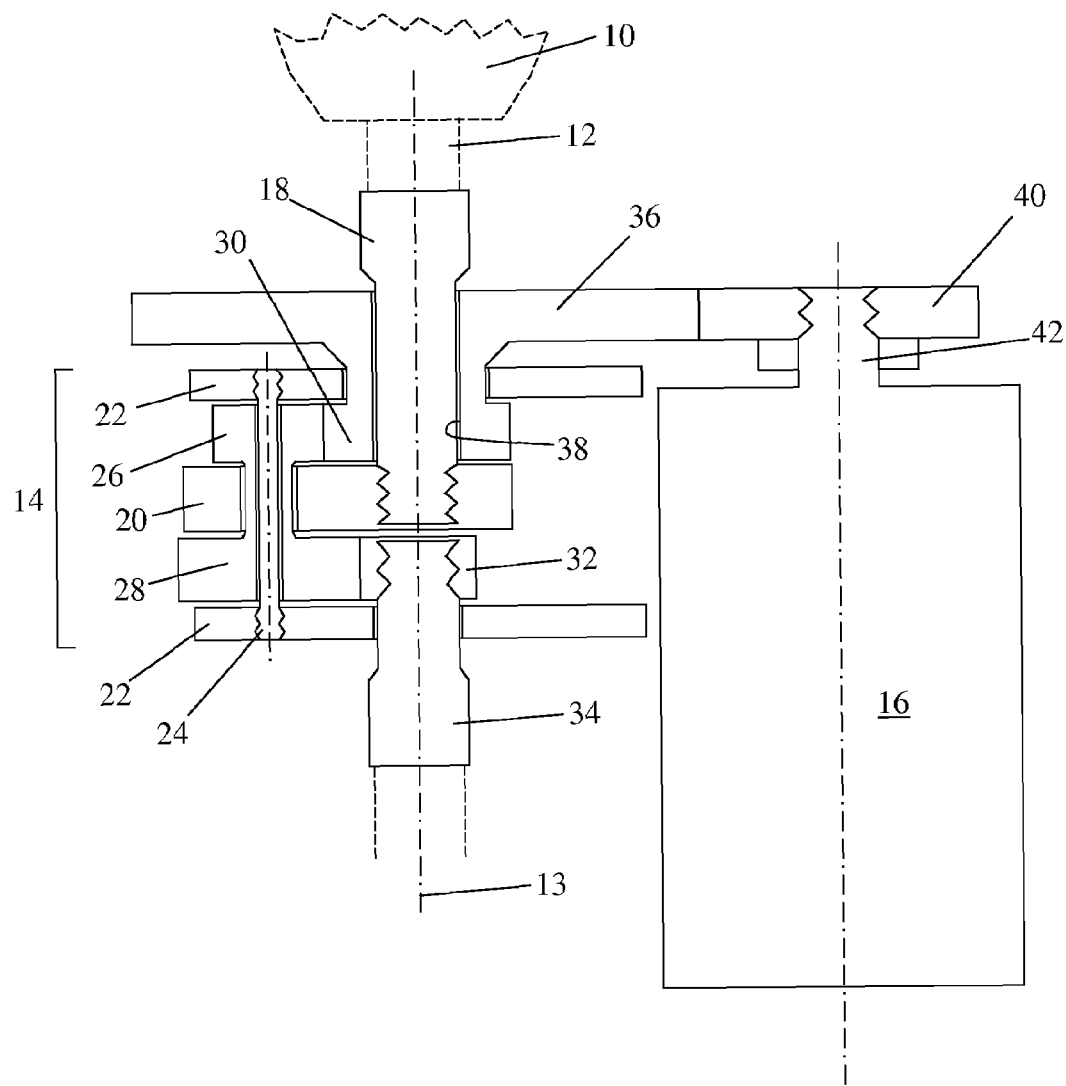
FIG. 1 is a schematic view of a first embodiment of the present invention, showing a cross section of the orbital gear complex.
Figure 2:
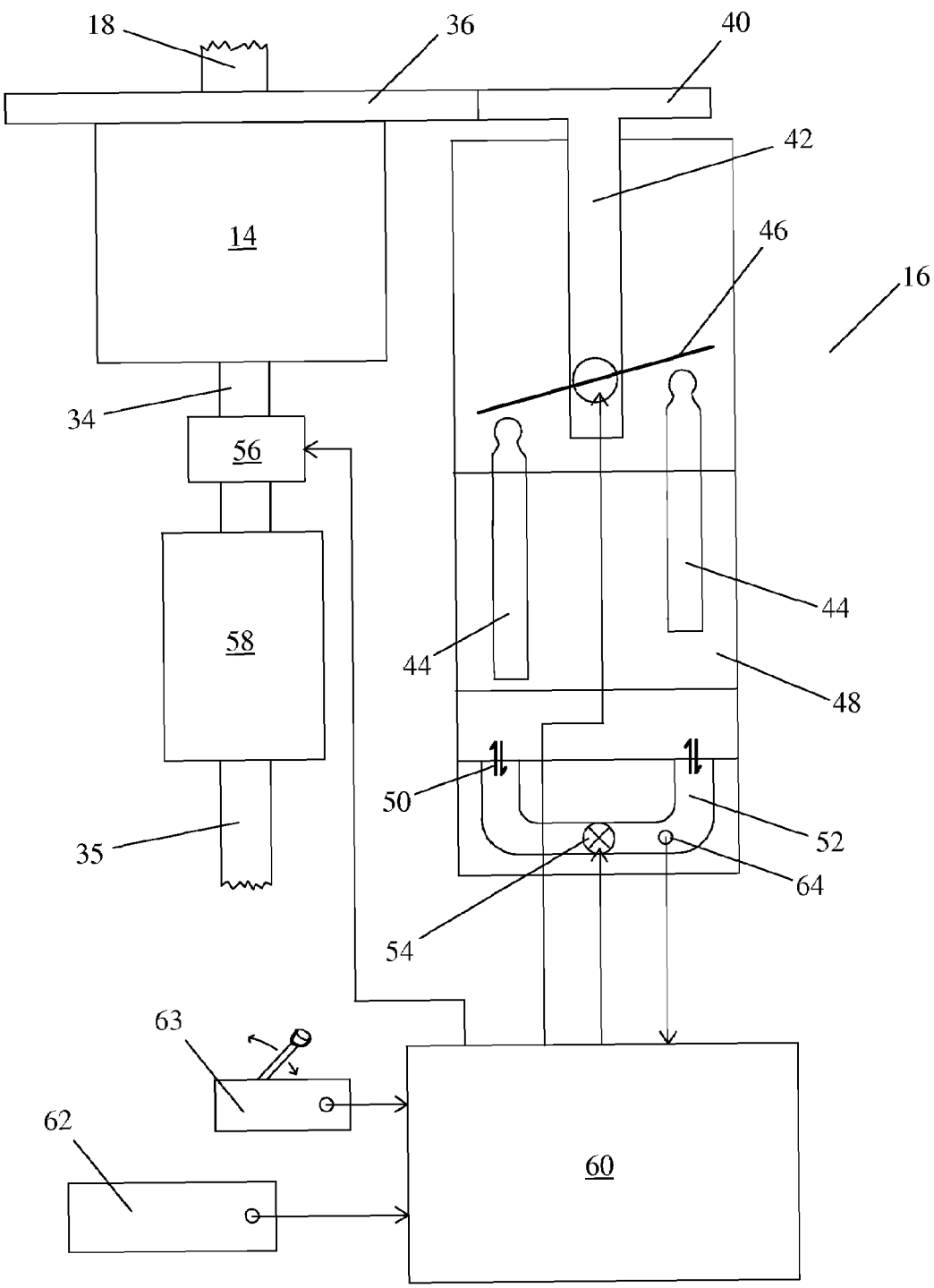
FIG. 2 is a block diagram of the transmission in FIG. 1, showing in schematic form a cross section of the invention's hydraulic jack machine.

FIG. 1 and FIG. 2 are schematic diagrams of a remarkably small and compact transmission in embodiments of the present invention attached to the crankshaft 12 of a primary engine 10 that provides an input for an orbital gear complex 14 which is in combination with a rotary control device that is disclosed in this preferred embodiment as a hydraulic jack machine 16. An input shaft 18 is splined to engine crankshaft 12, both of which are aligned along a first axis 13. A central drive plate 20 is positioned between the two end plates 22, and these just-named three elements together form the orbital web of the transmission that also rotates about first axis 13. Input shaft 18 is also splined to central drive plate 20. End plates 22 support the respective ends of orbit shaft 24 that carries a cluster gear that includes cluster gear 26 and cluster gear 28. While a preferred orbital gear complex comprises at least two or three sets of orbit shafts 24 and cluster gears 26/28, only one set is shown for clarity. Also, engine crankshaft 12 may alternatively be splined directly to the central drive plate 20. Central drive plate 20 has openings to provide clearance for cluster gears 26/28, and a control gear 30 meshes with cluster gears 26, while cluster gears 28 mesh with an output gear 32 coupled to a transmission output shaft 34 that, in turn, is connected to a vehicle drive shaft 35 (as will be explained in further detail below).

Control gear 30 is fixed to a control drive gear 36, and both control gears 30, 36 are similarly fixed to a hollow shaft 38 that circumscribes transmission input shaft 18. Control drive gear 36 is in mesh with a hydraulic drive gear 40 fixed to the drive shaft 42 of hydraulic machine 16 that creates the resistance torque that controls the output of orbital gear complex 14. Control gear 30 is larger than cluster gear 26, and cluster gear 28 is larger than output gear 32.

In one preferred embodiment of the present invention, the gear tooth ratios for the orbital gearing are as follows, with reference numerals from FIG. 1 and FIG. 2:

| | Gear | No. of Teeth |
|---|---|---|
| a. | Control gear 30 | 32 |
| b. | Cluster gear 26 (in mesh w/30) | 19 |
| c. | Cluster gear 26 (fixed to 26) | 33 |
| d. | Output gear 32 (in mesh w/28) | 22 |
| e. | Control drive gear 36 (fixed to 30) | 60 |
| f. | Hyd. machine drive gear 40 (in mesh w/36) | 30 |

Hydraulic jack machine 16, which operates as the transmission's rotary control device in a disclosed preferred embodiment, includes a plurality of pistons 44 arranged in cylinders (not individually shown). The stroke of the pistons 44 is controlled by the position of an adjustable swash plate 46 that rotates with drive shaft 42 and hydraulic drive gear 40. The cylinder block 48 includes a cylinder for each piston, each cylinder having input and output ports 50 connected through only a very minimal passage 52 closable by a fluid pressure valve 54 that also serves as a pressure relief valve (e.g., for avoiding increases in pressure above 4000 psi within machine 16).

When swash plate 46 is set at 0°, drive shaft 42 and swash plate 46 may freely rotate without resulting in any significant increase of fluid pressure in any portion of hydraulic machine 16, including minimal passage 52. However, when pressure valve 54 is closed, blocking off minimal passage 52, and swash plate 46 is moved in a forward direction, the increasing inclination of swash plate 46 results in increasing hydraulic pressure within the hydraulic machine, slowing the rotation of swash plate 46, drive shaft 42, hydraulic drive gear 40 and control drive gear 36, providing a resistance torque that decreases rotation of control gear 30 proportional to the increase of the resistance torque. This resistance torque varies directly with the fluid pressure in hydraulic machine 16, and when swash plate 46 is moved to a predetermined maximum angle, the resistance torque prevents rotation of control gear 30. The changes in hydraulic pressure just described all preferably occur with no fluid motion other than a minimal blow-by replenished by a small conventional charge pump (not shown) to the low pressure side of hydraulic machine 16 at a maximum rate of less than one gallon per minute.

In a disclosed preferred embodiment, output shaft 34 from orbital gear complex 14 preferably connects through a standard clutch mechanism 56 to a standard "forward/reverse" gear complex 58, this gear change being conventionally controlled by a standard gear-shift lever. While the final output of the forward and/or the reverse gearing of complex 58 can remain at 1:1 with the transmission output, some differing output gear ratios may be desired in some designs. Also, a computer 60 preferably monitors (a) the vehicle accelerator pedal 62 (both position and rate of change), (b) a manual shift lever 63, and (c) hydraulic fluid pressure in hydraulic machine 16 by a fluid pressure sensor 64 to control (d) adjustment of swash plate 46, (e) operation of clutch 56, and (f) adjustment of fluid pressure valve 54.

Start-Up

When the vehicle is stationary and the engine is first started, the following events preferably occur: The engine begins to operate at idle (e.g., 750 rpm). The orbital web 20, 22 of small gear complex 14 rotates with engine crankshaft 12 at engine speed. The wheels of the parked vehicle are standing still on the terrain and, since transmission output gear 32 is connected to the vehicle drive shaft 35, output gear 32 is held in a stopped condition. With orbital web 20, 22 rotating orbit shaft 24 and cluster gears 26, 28 about first axis 13 while output gear 32 is held stopped, cluster gear 28 rolls around stopped output gear 32 as the orbital web moves with the engine drive. Under these conditions, with the preferred gear ratios indicated above and with swash plate 46 of hydraulic machine 16 set at 0°, control gear 30 rotates at approximately one-half the engine input speed (e.g., 300 rpm), and hydraulic drive gear 40, shaft 42, and swash plate 46 all merely rotate freely at some predetermined overdrive rate faster than the speed of control gear 30, adding only a minimal frictional load. Once again, special attention is called to the fact that the hydraulic machine disclosed in a preferred embodiment herein uses a variation of the above-mentioned prior art Torvec long-piston hydraulic machine disclosed in U.S. Pat. No. 6,983,680 and U.S. 2004/0168567, which assures the successful operation of the just-described neutral "minimal-load" condition.

From Standing Stop

Upon vehicle startup from a standing stop, the following events preferably occur: While engine 10 remains at idle (e.g., 750 rpm), pressure valve 54 is closed and swash plate 46 is initially moved in the forward direction, either manually or under computer control in response to the depression of accelerator pedal 62. The immediate pressure build-up within hydraulic jack machine 16 results in sufficient blow-by to permit swash plate 46 to move about 1-1.5°, and this same immediate pressure increase causes a slow down of control gear 30 from its free-wheeling speed at approximately one-half the idling speed of the engine (e.g., 300 rpm). Gear complex 14 responds to this slow down of control gear 30 by creating a momentary near-infinite gear reduction at the output gear that, in a fraction of a second, drops to 1000-300:1 gear reduction, starting the vehicle's wheels to turn at very slow rpm with very high torque.

Thereafter, the vehicle is accelerated in response to the continued movement of swash plate 46 in the forward direction. However, it is important to note that blow-by in closed hydraulic jack machine 16 remains constant (e.g., less than 5% of the total volume of fluid blocked within the machine by the closed valve 54) and that the blow-by determines the maximum rate at which the angle of swash plate 46 can continue to increase. Nonetheless, this maximum rate is relatively fast, and pressure in hydraulic machine 16 increases in direct proportion to the movement of swash plate 46. This increasing pressure creates resistance torque that opposes and slows the rotation of swash plate 46, hydraulic machine drive shaft 42, hydraulic drive gear 40, control drive gear 36, and control gear 30. The increasing slow down of control gear 30 results in the concomitant gradual increase in the rotation of transmission output shaft 34 at the just-described extremely high gear ratio that quickly drops to about 30-20:1, multiplying the engine torque proportionally, starting to move the vehicle wheels.

This forward movement of swash plate 46 continues as the vehicle accelerates, further lowering the gear ratio, until the vehicle reaches around 30-40 mph. At this point, the following conditions occur almost simultaneously: (a) swash plate 46 reaches a maximum angle (e.g., 25°); (b) control gear 30 stops; (c) the hydraulic pressure in hydraulic machine 16 remains "locked" (like a hydraulic jack), exerting a constant back pressure that maintains control gear 30 in its stopped condition; and (d) transmission output gear 32 is running at a predetermined overdrive condition as efficiently as if it were held by a clutch.

The locked condition of hydraulic machine 16 is maintained as the continuing blow-by (e.g., less than 1 gal/min at vehicle speeds of 50 mph) is conventionally replaced to the low pressure (suction) side of the machine by a small charge pump.

When Cruising

At highway cruising speeds (i.e., with swash plate 46 at 25° and control gear 30 stopped), when greater drive torque is required, such as for maintaining speed on an incline or passing another vehicle, the operator merely moves shift lever 63 slightly back from its limit position. This is all that is required to move swash plate 46 to a slightly lower angle (e.g., 22°), thereby re-starting movement of hydraulic pistons 44 and control gear 30, to increase the transmission gear-ratio and output torque.

The vehicle may be provided with a well-known "cruise control" feature. If so, when traveling under cruise control at some desired cruising speed and the vehicle encounters a hill, the increased load on the transmission is noted by the operator, or through fluid pressure sensor 64 in minimal passage 52 by computer 60, and this pressure increase is compensated by moving swash plate 46 back a few degrees (e.g., from 25° to 22°) either by computer input or by manual movement of shift lever 63 back slightly from its maximum (e.g., 25°) position. This causes some reduction of pressure within hydraulic machine 16 that, in turn, results in some movement of control gear 30 to cause an increase in the gear ratio within the transmission, resulting in an increase in output torque until the vehicle again reaches the desired cruising speed and the pressure within the hydraulic system once again becomes balanced. Swash plate 46 is returned to the maximum (e.g., 25°) position during this increase in vehicle speed, increasing resistance torque to once again stop control gear 30, and the vehicle maintains its desired speed.

Similarly, when it is desired to slow the vehicle from a cruising speed, accelerator pedal 62 is released and shift lever 63 is moved back towards the 0° swash plate position, creating increasing braking torque from the slowed engine through the resulting rapidly increasing gear-ratios. Should shift lever 63 near the 0° swash plate position, clutch 56 is engaged before the vehicle's drive wheels are locked.

Special attention is called to the fact that hydraulic machine 16 is not operating like a conventional pump or motor, and thus, the increasing resistance torque provided by hydraulic machine 16 is not generated by an increasing flow of hydraulic fluid. To the contrary, with minimal passage 52 between hydraulic input and output ports 50 blocked by pressure valve 54, there is no significant volumetric flow of hydraulic fluid at any time. As indicated above, the only flow of fluid is a relatively small blow-by in response to the pressure being developed within hydraulic machine 16 accompanied by a concomitant replenishing of the blow-by to the low pressure side from a conventional charge pump. In effect, hydraulic machine 16 operates like a hydraulic "jack". Each successive movement of swash plate 46 corresponds to the cranking of the jack handle, causing movement of the pistons of the machine to create ever-increasing levels of hydraulic pressure that act as resistance torque to slow the rotation of swash plate 46, in a manner similar to the way that each crank of the jack handle increases pressure in the small hydraulic jack to slowly raise the load without any appreciable flow of hydraulic fluid.

Special attention is also called to another very important feature of the invention. As indicated above, when the vehicle is stopped and there is no movement of output gear 32, the orbital gearing creates a mechanical advantage of the engine input to cause control gear 30 to rotate at a predetermined reduction of the idling engine speed. The gear ratio between hydraulic drive gear 42 and control-drive-gear 36/control gear 30 is intentionally selected to create the same mechanical advantage for the resistance torque pressure developed by the hydraulic machine 16 as that resistance torque enters and affects the orbital gearing and the transmission output. Thus, in effect, the hydraulic resistance torque that slows control gear 30 enters the gear complex at a reduction that matches the engine torque reduction. As just explained above, the preferred embodiment disclosed provides the desired matching-engine resistance torque by selecting a similar 2:1 gear reduction between hydraulic drive gear 40 and control drive gear 36. However, this reduction can be made even higher to require less initial resistance torque from machine 16 to match engine torque (such as if the transmission is being used with a diesel engine).

In actual vehicle testing, a vehicle with a transmission of the present invention readily attained the 30 mph speed while the engine was maintained at a little over 750 rpm. However, the acceleration of the vehicle from stop to this speed may take as long as 12-15 seconds depending on road conditions. Since most operators prefer a faster acceleration, this preference may be achieved manually by no more than a minor increase in the angle of the accelerator pedal. Computer control 60 senses the indicated pedal angle to increase acceleration at a more generally acceptable rate (e.g., 100 rpm/sec). This increased acceleration is achieved without the conventional racing of the engine to over 2000 rpm. Instead, the operator or computer progressively selects relatively low levels of increasing engine rpm, (e.g., from a continuum of 750-1500 rpm). The rate of this engine speed progression is controlled to optimize the horsepower/fuel consumption for the desired acceleration rate, as indicated by the depression angle of the accelerator. After the vehicle reaches a desired speed level, again indicated by accelerator position, the engine speed is backed off to the lowest rpm level necessary to maintain that attained speed.

While the following may be a reiteration of the above explanation, some persons may best appreciate the general operation of a transmission of the present invention with the help of the following description of a basic embodiment in which the swash plate of the hydraulic machine is manually controlled by using simple shift lever 63. After the vehicle is started and while engine 10 is still at idling speed, the standing vehicle is initially accelerated by moving shift lever 63 very slightly in the forward direction, just enough to initiate vehicle movement. Immediately thereafter, accelerator pedal 62 is depressed slightly to increase engine speed by only a few hundred rpm. With only small increments of additional pressure on the accelerator pedal, depending on the rate of vehicle acceleration desired, shift lever 63 is continually moved in the forward direction, until the vehicle reaches a desired speed or until the shift lever 63 reaches its limit (e.g., the 25° swash plate position) and the transmission reaches the predetermined overdrive for sustained cruising operation. The rate of acceleration is controlled completely by the operator, and even the fastest acceptable rates can be achieved with relatively minimal increases in engine rpm. Of course, after a cruising speed appropriate for the terrain and traffic conditions is achieved, the shift lever 63 is allowed to remain in the position that provides the desired cruising speed, and accelerator pedal 62 may be relaxed to a lower level of engine rpm necessary to sustain the attained cruising speed.

Accumulator Embodiment

Figure 3:
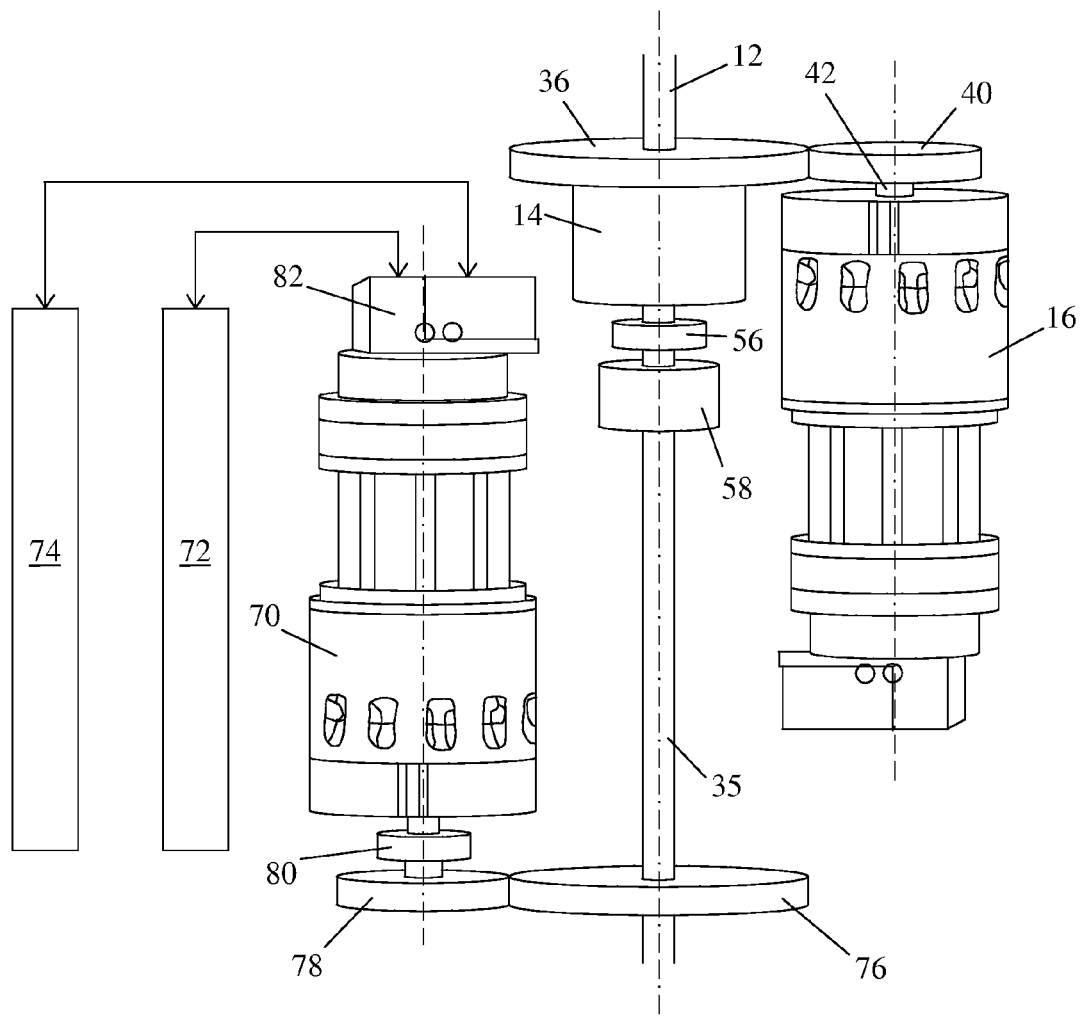
FIG. 3 is a partially schematic view of a second embodiment of the present invention including accumulator apparatus appropriate for use in hybrid vehicles.

Another embodiment of the present invention, shown in partially schematic FIG. 3, includes an apparatus that permits operation in regeneration modes similar to those used in well-known "hybrid" vehicle designs.

In this embodiment, the transmission converts torque from engine crankshaft 12 to vehicle drive shaft 35 in the manner just explained above with reference to FIGS. 1 and 2. A second hydraulic machine 70 is added along with a fluid storage tank 72, a fluid pressure tank 74, accumulator transfer gears 76, 78, a clutch 80, and an accumulator control valve 82.

Whenever the vehicle is braking or coasting, accumulator control valve 82 interconnects hydraulic machine 70 to accumulator tanks 72, 74, and, simultaneously, clutch 80 connects transfer gears 76, 78 to the drive shaft of hydraulic machine 70. During such coasting or braking conditions, the rotation of vehicle drive shaft 35 is increased by gears 76, 78 to energize hydraulic machine 70 which acts like a regeneration pump to draw fluid from storage tank 72 and deliver it under pressure to pressure tank 74. Pressure tank 74 is preferably primarily a steel tube, capped at each end with the interior of pressure tank 74 including a bladder that is filled with a compressible gas in the manner well-known in the art. Regenerative fluid enters pressure tank 74 under pressure that begins to compress the gas in the bladder until pressure tank 74 is full.

Storage tank 72 is preferably similar to pressure tank 74 except that it contains no gas-filled bladder and it is initially filled with fluid sufficient for the normal operation of the regeneration system. For many vehicles, elongated tubes that comprise storage tank 72 and pressure tank 74 may be approximately 8'-10' long and may be positioned along side each of the respective side rails of the vehicle's frame.

During braking or coasting, engine 10 returns to its idle speed and swash plate 46 is readjusted toward the 0° position, causing transmission 14 to produce an ever-increasing reduction and braking torque in output gear 32 and vehicle crankshaft 35, and clutch 56 is disengaged before the vehicle is braked to a stop, as explained above.

As soon as pressure tank 74 is full, or as soon as the vehicle reaches a predetermined minimal operating speed, whichever occurs first, the regeneration circuit is closed off (i.e., valve 82 is moved to its closed position and clutch 80 is disengaged), and the transmission is returned to normal operation (i.e., the swash plates of hydraulic machines 16 and 70 are reoriented to their respective normal positions) based upon the vehicle speed condition then prevailing.

When it is desired to restart or reaccelerate the vehicle, hydraulic machine 16 operates in the manner explained above, while clutch 80 is engaged and valve 82 is moved to its open position. The pressurized fluid stored in pressure tank 74 is released to energize hydraulic machine 70 which now acts like a regeneration motor, adding driving torque to engine drive shaft 35 through the reduction of transfer gears 78, 76. During the time that pressurized fluid is being delivered from pressure tank 74, the regeneration system remains activated (i.e., valve 82 remains open) so that the regeneration fluid is returned to storage tank 72, while engine 10 remains at idle speed. As soon as the vehicle reaches a desired operating speed, or as soon as pressure tank 74 is depleted of pressurized fluid, whichever occurs first, the regeneration circuit is closed off (i.e., valve 82 is closed and clutch 80 is disengaged), and the speed of engine 10 and the transmission are returned to normal operation.

It should be noted that transfer gears 76, 78 have an increasing ratio (e.g., 1:3 between engine drive shaft 35 and hydraulic machine 70 when the latter 14 is acting as a pump, increasing the effective speed of hydraulic pump 70 to a multiple (e.g., three times) of the speed of output shaft 35. Thus, the saved energy from the inertia of output shaft 35 is accumulated in pressure tank 74 at a much faster rate (e.g., three times faster) than it is being lost during the coasting/braking operation. As just indicated above, this stored energy is returned to the vehicle wheels through transfer gears 78, 76 by torque-increasing reduction.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A transmission for a primary engine, the transmission comprising:
   a rotary control device; and
   an orbital gear complex comprising only:
      an orbiter web mounted for rotation about a first axis and responsive to an input drive provided by the primary engine;
      a control gear mounted for rotation about the first axis and responsive to a control drive provided by the rotary control device;
      an output gear mounted on the first axis; and
      at least one cluster gear mounted for rotation on an orbit shaft positioned parallel with the first axis and supported on said orbiter web in mesh with only said control gear and said output gear to permit the orbit shaft and the cluster gear to orbit, respectively, said first axis and said control gear and output gear;
   wherein a first gear tooth ratio between said cluster gear and said control gear and a second gear tooth ratio between said cluster gear and said output gear are selected such that, when rotation of the control gear is prevented, rotation of said orbiter web produces rotation of said output gear at a predetermined overdrive of the input drive provided by the primary engine; and
   wherein, when rotation of said output gear is prevented, rotation of said orbiter web produces rotation of the control gear at a predetermined reduction of the input drive provided by the primary engine.

2. The transmission of claim 1, wherein said rotary control device comprises a resistance apparatus for developing a resistance torque sufficient to match a torque of the primary engine for slowing rotation of the control gear.

3. The transmission of claim 2, wherein said rotary control device comprises a single hydraulic machine having a plurality of pistons in cylinders with input and output ports connected through only a minimal passage closable by a fluid valve, said hydraulic machine also having a drive shaft connected to an adjustable swash plate for varying a hydraulic pressure in the machine.

4. The transmission of claim 3, wherein, when the swash plate of the hydraulic machine is set at a swash plate angle of 0° and the fluid valve is open, the drive shaft and swash plate freely rotate without causing a significant increase in the hydraulic pressure in said machine.

5. The transmission of claim 3, wherein, when the fluid valve is closed and the swash plate of the hydraulic machine is moved in a forward direction, increasing the swash plate angle increases the hydraulic pressure in the machine and slows a rate of rotation of the drive shaft, thereby providing a resistance torque to decrease a rate of rotation of the control gear proportional to the increase of said resistance torque.

6. The transmission of claim 5, wherein, when the swash plate of the hydraulic machine is moved to a predetermined maximum angle, said resistance torque prevents rotation of the control gear.

7. The transmission of claim 3, wherein the drive shaft of the hydraulic machine is connected to said control gear through a control drive reduction gear at a predetermined ratio.

8. The transmission of claim 7, wherein said control drive reduction gear provides a torque resistance to the rotation of the control gear of at least the same predetermined reduction as input drive torque of the primary engine is provided to the control gear.

9. The transmission of claim 3, wherein said primary engine and transmission are operatively connected to a plurality of wheels of an automotive vehicle that comprises:
   the primary engine;
   a vehicle speed-change apparatus controllable by an operator of the vehicle for making desired changes in vehicle operations;
   a pressure sensor positioned within said minimal passage; and
   a computer with interconnections to said vehicle speed-change apparatus, said pressure sensor, said fluid valve, and said swash plate.

10. The transmission of claim 9, wherein, when the vehicle is stopped and the primary engine is operating, the computer opens the fluid valve connecting the input and output ports and positions the swash plate at a swash plate angle of 0°.

11. The transmission of claim 9, wherein, when activation of said vehicle speed-change apparatus by the operator indicates a desired increase in vehicle speed, the computer closes the valve connecting the input and output ports and moves the swash plate in a forward direction.

12. The transmission of claim 1, wherein the input drive comprises a crankshaft of the primary engine aligned with the first axis, and wherein:
   said orbiter web further comprises:
      a pair of separated support elements for mounting the orbit shaft of the cluster gear; and
      a drive element fixed to and positioned between the support elements and having at least one passage to allow the cluster gear to rotate freely therein, said drive element being fixed for rotation with the input drive;
   wherein said control gear is mounted on a hollow shaft that circumscribes the crankshaft.

13. The transmission of claim 1, wherein said primary engine and transmission are operatively connected to a plurality of wheels of an automotive vehicle by a vehicle drive shaft, and said transmission further comprises:
   an accumulator apparatus connectable to the vehicle drive shaft;
   an energy storage facility; and
   an accumulator control for activating said accumulator apparatus:
      to collect energy from the drive shaft when the vehicle is standing or slowing and store collected energy in the storage facility; and
      to retrieve energy from the storage facility when the vehicle is accelerating and deliver energy to the vehicle drive shaft.

14. The transmission of claim 13, wherein said accumulator apparatus comprises an accumulator hydraulic machine and said energy storage facility comprises a first tank of supply fluid and a second tank for holding pressurized fluid.

15. The transmission of claim 13, wherein said accumulator apparatus comprises an electric generator/motor and said energy storage facility comprises an electric storage battery.

16. A transmission for a primary engine, the transmission comprising:
   an orbiter gear complex comprising only:
      an input connecting the primary engine to an orbiter web, a control gear and an output gear, all mounted for rotation about a first axis, and
      at least one cluster gear mounted for rotation on an orbit shaft positioned parallel with the first axis and supported on said orbiter web in mesh with only said control gear and said output gear to permit the orbit shaft and the cluster gear to orbit, respectively, said first axis and said control gear and output gear;
   wherein a first gear tooth ratio between said cluster gear and said control gear and a second gear tooth ratio between said cluster gear and said output gear are selected such that:
      when rotation of the control gear is prevented, rotation of said orbiter web produces rotation of said output gear at a predetermined overdrive of the input drive provided by the primary engine; and
      when rotation of the output gear is prevented, rotation of said orbiter web produces rotation of said control gear at a predetermined reduction of the input drive provided by the primary engine; and
   a control device for providing a resistance torque;
   said control gear being responsive to the resistance torque provided by said control device, rotation of the control gear being slowed in proportion to the resistance torque provided by said control device.

17. The transmission of claim 16, wherein said control device comprises a hydraulic jack.

18. The transmission of claim 17, wherein said hydraulic jack comprises:
   a rotational drive element;
   an angularly adjustable swash plate fixed to said drive element;
   a plurality of pistons reciprocally mounted in respective cylinders formed in a cylinder block and positioned circumferentially at a first radial distance about the rotational axis of the drive element;
   each piston having an axial body portion and a head end and each respective cylinder having a valve end and an open head portion beyond which the head end of each respective piston extends at all times to contact said swash plate; and
   each piston having a stroke determined by the angular adjustment of the swash plate, said stroke varying up to a predetermined maximum; and
   an input port and an output port connected to each valve end of each cylinder, said input and output ports also being connected to each other by a minimal fluid passage opened and closed by a pressure valve;
   such that when said minimal fluid passage is closed by said pressure valve, the rotation of the swash plate is resisted by fluid pressure developed within the jack, said pressure being proportional to the angular adjustment of the swash plate.

* * * * *